United States Patent
Casaregola et al.

(10) Patent No.: US 11,347,483 B2
(45) Date of Patent: May 31, 2022

(54) LINKING STAGES IN PROCESS FLOWS WITH MACHINE LEARNING

(71) Applicant: ADP, Inc., Roseland, NJ (US)

(72) Inventors: Claire Casaregola, New York, NY (US); David Dushaj, New York, NY (US); Michael Greene, New York, NY (US); Yair Pike, New York, NY (US); Alexander Chan, New York, NY (US); Lauren Miller, New York, NY (US)

(73) Assignee: ADP, Inc., Roseland, NJ (US)

( * ) Notice: Subject to any disclaimer, the term of this patent is extended or adjusted under 35 U.S.C. 154(b) by 8 days.

(21) Appl. No.: 17/069,274

(22) Filed: Oct. 13, 2020

(65) Prior Publication Data

US 2022/0113951 A1    Apr. 14, 2022

(51) Int. Cl.
| | |
|---|---|
| *G06F 9/44* | (2018.01) |
| *G06F 8/41* | (2018.01) |
| *G06N 20/00* | (2019.01) |
| *G06F 8/33* | (2018.01) |
| *G06F 8/34* | (2018.01) |

(52) U.S. Cl.
CPC ................ *G06F 8/433* (2013.01); *G06F 8/33* (2013.01); *G06F 8/34* (2013.01); *G06N 20/00* (2019.01)

(58) Field of Classification Search
None
See application file for complete search history.

(56) References Cited

U.S. PATENT DOCUMENTS

| | | | |
|---|---|---|---|
| 2012/0198322 A1* | 8/2012 | Gulwani | G06F 40/18 715/217 |
| 2013/0346982 A1* | 12/2013 | Kalai | G06N 5/025 718/100 |
| 2014/0013299 A1* | 1/2014 | Bordeaux | G06F 8/30 717/106 |
| 2014/0059078 A1* | 2/2014 | Gulwani | G06F 16/3344 707/772 |
| 2015/0254211 A1* | 9/2015 | Gulwani | G06F 40/103 715/256 |
| 2015/0254353 A1* | 9/2015 | Gulwani | G06F 16/90344 707/706 |
| 2015/0254530 A1* | 9/2015 | Gulwani | G06F 40/151 382/187 |
| 2017/0075661 A1* | 3/2017 | Gulwani | G06F 8/35 |
| 2018/0039693 A1* | 2/2018 | Singh | G06F 16/3335 |
| 2018/0107724 A1* | 4/2018 | Ganjam | G06F 21/604 |
| 2018/0113848 A1* | 4/2018 | Gulwani | G06F 16/2456 |

(Continued)

*Primary Examiner* — Anna C Deng
(74) *Attorney, Agent, or Firm* — Yee & Associates, P.C.

(57) ABSTRACT

A method for designing a logic flow for a user interface is provided. The method comprises receiving from a first task for an automation process file from a user. The automation process file defines a set of system activities. The first task is added to the automation process file and submitted to a machine learning engine, which determines a number of suggested tasks to be performed after the first task. The suggested tasks are based on frequencies with which previous users have used each task after the first task. The suggested tasks are then presented to the user. A second task is received from the user to be performed after the first task. The second task may be selected from the suggested tasks but not necessarily so. The second task is then added to the automation process file.

24 Claims, 9 Drawing Sheets

(56) References Cited

U.S. PATENT DOCUMENTS

| | | | |
|---|---|---|---|
| 2018/0113907 A1* | 4/2018 | Gulwani | G06F 16/258 |
| 2018/0113922 A1* | 4/2018 | Gulwani | G06F 16/258 |
| 2018/0121525 A1* | 5/2018 | Simmons | G06F 16/285 |
| 2018/0150500 A1* | 5/2018 | Le | G06F 16/254 |
| 2018/0150554 A1* | 5/2018 | Le | G06F 16/215 |
| 2018/0188897 A1* | 7/2018 | Gulwani | G06F 3/0482 |
| 2018/0246915 A1* | 8/2018 | Singh | G06F 16/221 |
| 2019/0034437 A1* | 1/2019 | Gulwani | G06F 40/211 |
| 2019/0102438 A1* | 4/2019 | Murray | G06F 16/221 |
| 2020/0097261 A1* | 3/2020 | Smith | G06N 3/0454 |

* cited by examiner

LINKING STAGES IN PROCESS FLOWS WITH MACHINE LEARNING

BACKGROUND INFORMATION

1. Field

The present disclosure relates generally to an improved computer system and, in particular, to using machine learning to recommend successive steps during construction of process flows.

2. Background

Software developers use specific tools to define and execute server-side logic to interact with external devices, read and write data, validate and process data, and send notifications to end users and other devices. It is common to use the same development tool for each mini application on a platform. This development process involves specifying a sequence of steps in a process flow for the logic to follow. The developer must click on every stage in the logic flow to see what type of stage it is, what properties have been added to the stage, and to what type of values the stage is mapped.

SUMMARY

An illustrative embodiment provides a computer-implemented method for designing a logic flow for a user interface. The method comprises receiving a first task for an automation process file from a user, wherein the automation process file defines a set of system activities. The first task is added to the automation process file and submitted to a machine learning engine. The machine learning engine determines a number of suggested subsequent tasks to be performed after the first task, wherein the suggested subsequent tasks are based on frequencies with which previous users have used each suggested subsequent task after the first task. The suggested subsequent tasks are then presented to the user. A second task is received from the user to be performed subsequent to the first task, wherein the second task may be selected from the suggested subsequent tasks but not necessarily so. The second task is then added to the automation process file.

Another illustrative embodiment provides a system for designing a logic flow for a user interface. The system comprises a bus system, a storage device connected to the bus system, wherein the storage device stores program instructions, and a number of processors connected to the bus system, wherein the number of processors execute the program instructions to: receive from a user a first task for an automation process file, wherein the automation process file defines a set of system activities; add the first task to the automation process file; submit the first task to a machine learning engine; determine, with the machine learning engine, a number of suggested subsequent tasks to be performed after the first task, wherein the suggested subsequent tasks are based on frequencies with which previous users have used each suggested subsequent task after the first task; provide the suggested subsequent tasks to the user; receive a second task from the user to be performed subsequent to the first task, wherein the second task may be selected from the suggested subsequent tasks; and add the second task to the automation process file.

Another illustrative embodiment provides a computer program product for designing a logic flow for a user interface. The computer program product comprises a computer-readable storage medium having program instructions embodied thereon to perform the steps of: receiving from a user a first task for an automation process file, wherein the automation process file defines a set of system activities; adding the first task to the automation process file; submitting the first task to a machine learning engine; determining, with the machine learning engine, a number of suggested subsequent tasks to be performed after the first task, wherein the suggested subsequent tasks are based on frequencies with which previous users have used each suggested subsequent task after the first task; providing the suggested subsequent tasks to the user; receiving a second task from the user to be performed subsequent to the first task, wherein the second task may be selected from the suggested subsequent tasks; and adding the second task to the automation process file.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account that software developers use specific tools to define and execute server-side logic, which involves specifying a sequence of steps in a process flow for the logic to follow.

The illustrative embodiments also recognize and take into account that is common to use the same development tool for each mini application on a platform. Depending on the type of logic process flow, these mini applications can be similar.

The illustrative embodiments also recognize and take into account that it is often on clear to developers how the logic flow will work upon opening and viewing the document in question. The developer must click on every stage in the logic flow to see what type of stage it is, what properties have been added to the stage, and to what type of values the stage is mapped.

The illustrative embodiments provide a method for designing a flow of logic underling a user interface (UI). For example, when a calculation is performed and encounters either success or an error, the logic flow determines the notification supplied to the user for either outcome. A machine learning method provides suggestions to developers for adding stages to a process logic flow and allowing the developers to add these stages beyond a simple drag and drop interaction within the development tool. When a developer selects a stage in the tool interface, an icon appears. Clicking on the icon presents a menu of routes, which are connections of various types between stages in the logic flow, depending on whether the system encounters an error or not. After selecting a route type, the user can select a subsequent stage listed in the interface to link to the previous stage, or the user can dive deeper into the presented menu, which offers a number of suggested stages selected by a machine learning engine.

As used here, "a number of" when used with reference to items means one or more items. For example, a number of suggested stages is one or more suggested stages.

The suggested stages comprise the most probable next stages in a ranked list based on the frequency with which previous developers have used each suggested stage in creating similar logic flows. Once the user has added a next stage to the logic flow and entered all of the property values for that stage, the user will see certain properties that are most important shown on the stage itself in the developer tool interface. Once the logic flow is in place, the UI can be built with a development tool linked to the logic flow.

Figure 1:
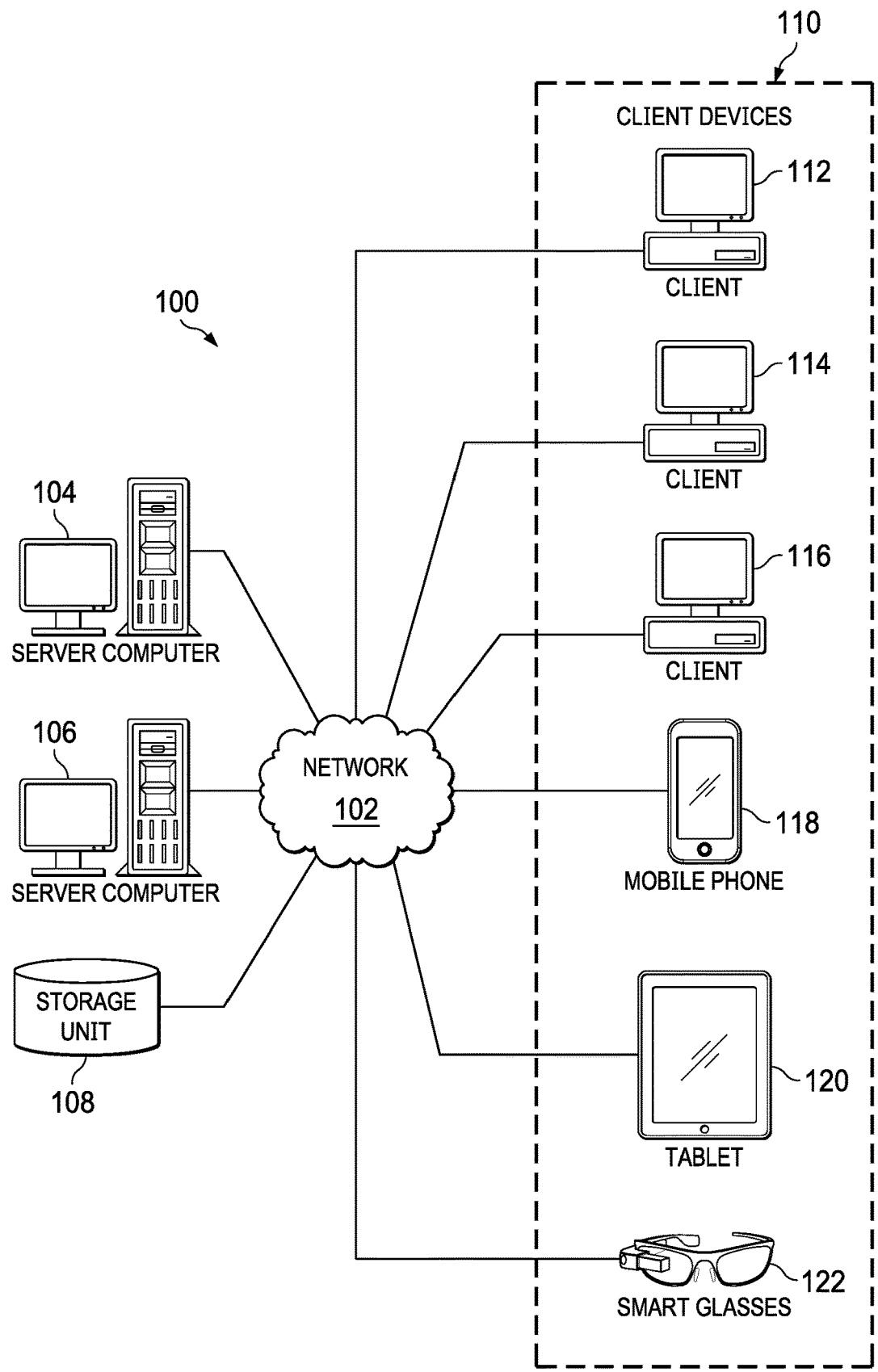
FIG. 1 is a pictorial representation of a network of data processing systems in which illustrative embodiments may be implemented.

With reference to FIG. 1, a pictorial representation of a network of data processing systems is depicted in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 might include connections, such as wire, wireless communication links, or fiber optic cables.

In the depicted example, server computer 104 and server computer 106 connect to network 102 along with storage unit 108. In addition, client devices 110 connect to network 102. In the depicted example, server computer 104 provides information, such as boot files, operating system images, and applications to client devices 110. Client devices 110 can be, for example, computers, workstations, or network computers. As depicted, client devices 110 include client computers 112, 114, and 116. Client devices 110 can also include other types of client devices such as mobile phone 118, tablet computer 120, and smart glasses 122.

In this illustrative example, server computer 104, server computer 106, storage unit 108, and client devices 110 are network devices that connect to network 102 in which network 102 is the communications media for these network devices. Some or all of client devices 110 may form an Internet of things (IoT) in which these physical devices can connect to network 102 and exchange information with each other over network 102.

Client devices 110 are clients to server computer 104 in this example. Network data processing system 100 may include additional server computers, client computers, and other devices not shown. Client devices 110 connect to network 102 utilizing at least one of wired, optical fiber, or wireless connections.

Program code located in network data processing system 100 can be stored on a computer-recordable storage medium and downloaded to a data processing system or other device for use. For example, the program code can be stored on a computer-recordable storage medium on server computer 104 and downloaded to client devices 110 over network 102 for use on client devices 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented using a number of different types of networks. For example, network 102 can be comprised of at least one of the Internet, an intranet, a local area network (LAN), a metropolitan area network (MAN), or a wide area network (WAN). FIG. 1 is intended as an example, and not as an architectural limitation for the different illustrative embodiments.

In the illustrative examples, the hardware may take the form of a circuit system, an integrated circuit, an application-specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Programmable logic devices include, for example, a programmable logic array, programmable array logic, a field programmable logic array, a field programmable gate array, and other suitable hardware devices. Additionally, the processes may be implemented in organic components integrated with inorganic components and may be comprised entirely of organic components, excluding a human being. For example, the processes may be implemented as circuits in organic semiconductors.

Figure 2:
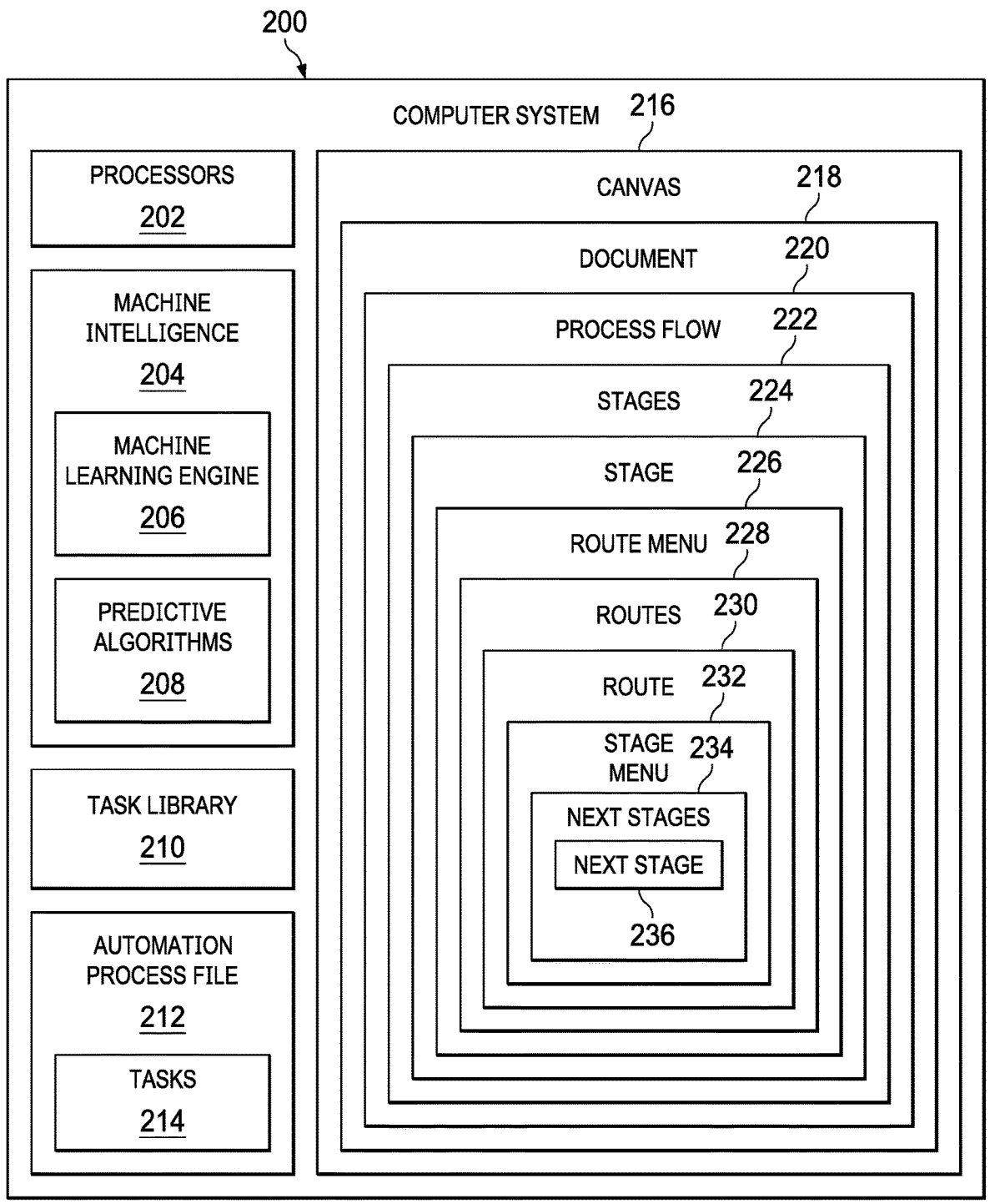
FIG. 2 is an illustration of a block diagram of a computer system for development of a logic flow for a user interface in accordance with an illustrative embodiment.

Turning to FIG. 2, a block diagram of a computer system for development of a logic flow for a user interface is depicted in accordance with an illustrative embodiment. Computer system 200 might be an example of client devices 110 in FIG. 1 and might be used to develop server-side logic for a server such as server 104.

Computer system 200 comprises a number of processors 202 and machine intelligence 204. Machine intelligence 204 comprises machine learning engine 206 and predictive algorithms 208.

Machine intelligence 204 can be implemented using one or more systems such as an artificial intelligence system, a neural network, a Bayesian network, an expert system, a fuzzy logic system, a genetic algorithm, or other suitable types of systems. Machine learning engine 206 and predictive algorithms 208 can make computer system 200 a special purpose computer for dynamic predictive modelling.

In an embodiment, processors 202 comprises one or more conventional general-purpose central processing units (CPUs). In an alternate embodiment, processors 202 comprises one or more graphical processing units (GPUs). Though originally designed to accelerate the creation of images with millions of pixels whose frames need to be continually recalculated to display output in less than a second, GPUs are particularly well suited to machine learning. Their specialized parallel processing architecture allows them to perform many more floating-point operations per second then a CPU, on the order of 100× more. GPUs can be clustered together to run neural networks comprising hundreds of millions of connection nodes. Processors can also comprise a multicore processor, a physics processing unit (PPU), a digital signal processor (DSP), a network processor, or some other suitable type of processor. Further processors 202 can be homogenous or heterogeneous. For example, processors 202 can be central processing units. In another example, processors 202 can be a mix of central processing units and graphical processing units.

Canvas 216 provides an interface in which the user can open a document 218 to develop a process flow 220 for software functions such as for a UI. Computer system 200 comprises task library 210 of possible system activities from which the user can select stages 222 of process flow 220. As stages 222 are added to process flow 220, system tasks 214 associated with the stages are added to automation process file 212, which defines a set of system activities for an automation interface.

For each stage 224 among stages 222, the user might select a route menu 226 from which the user can select a number of routes 228 from which process flow 220 proceeds after stage 224. The choices offered in route menu 226 might depend on the specific properties of stage 224. For example, if stage 224 is a decision step, route menu 226 might include possible links to subsequent stages depending on if the decision has a true value or a false value. As another example, if stage 224 is an extract, transform, load (ETL) job, route menu 226 might include options to link to subsequent stages depending whether the ETL job is successful or there is an error.

After a route 230 has been selected from route menu 226, the user might then be presented with a stage menu 232 that includes a number of possible next stages 234 to perform after stage 224. The choice of next stages 234 in stage menu 232 might depend on the properties of stage 224 and the route 230 selected from stage 224. Next stages 234 presented in stage menu 232 or a subset thereof might be suggestions generated by machine learning engine 206. For example, suggested next stages 234 might comprise a ranking listing of five subsequent stages that have been most commonly used by other developers after stage 224 or similar stages. By learning from past developer experience, machine learning engine 206 can assist the user in selecting the next stage 236 in process flow 220, thereby reducing the time and effort expended by the user.

There are three main categories of machine learning: supervised, unsupervised, and reinforcement learning. Supervised machine learning comprises providing the machine with training data and the correct output value of the data. During supervised learning the values for the output are provided along with the training data (labeled dataset) for the model building process. The algorithm, through trial and error, deciphers the patterns that exist between the input training data and the known output values to create a model that can reproduce the same underlying rules with new data. Examples of supervised learning algorithms include regression analysis, decision trees, k-nearest neighbors, neural networks, and support vector machines.

If unsupervised learning is used, not all of the variables and data patterns are labeled, forcing the machine to discover hidden patterns and create labels on its own through the use of unsupervised learning algorithms. Unsupervised learning has the advantage of discovering patterns in the data with no need for labeled datasets. Examples of algorithms used in unsupervised machine learning include k-means clustering, association analysis, and descending clustering.

Whereas supervised and unsupervised methods learn from a dataset, reinforcement learning methods learn from feedback to re-learn/retrain the models. Algorithms are used to train the predictive model through interacting with the environment using measurable performance criteria.

However, the user does not necessarily have to select a next step suggested by machine learning engine 206. Rather, the user might also have the option to manually search task library 210 for other possible stages that are allowed by computer system 200. If the user chooses not to select one of the suggestions, machine learning engine 206 can use this alternative selection as learning data to improve future suggestions.

After the user selects the next stage 236 and adds it to process flow 220, stage 236 is added to tasks 214 in automation process file 212. Tasks 214 can be defined as JavaScript object notation (JSON) objects.

Computer system 200 can be implemented in software, hardware, firmware or a combination thereof. When software is used, the operations performed by computer system 200 can be implemented in program code configured to run on hardware, such as a processor unit. When firmware is used, the operations performed by computer system 200 can be implemented in program code and data and stored in persistent memory to run on a processor unit. When hardware is employed, the hardware may include circuits that operate to perform the operations in computer system 200.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

These components can be located in a computer system, which is a physical hardware system and includes one or more data processing systems. When more than one data processing system is present in the computer system, those data processing systems are in communication with each other using a communications medium. The communications medium can be a network. The data processing systems can be selected from at least one of a computer, a server computer, a tablet computer, or some other suitable data processing system.

FIGS. 3-9 illustrate the steps of adding stages to a UI logic flow canvas 300 in accordance with an illustrative embodiment. Document 302 might be an example of document 218 in FIG. 2 that is opened in a canvas 300, which might be an example of canvas 216.

Figure 3:
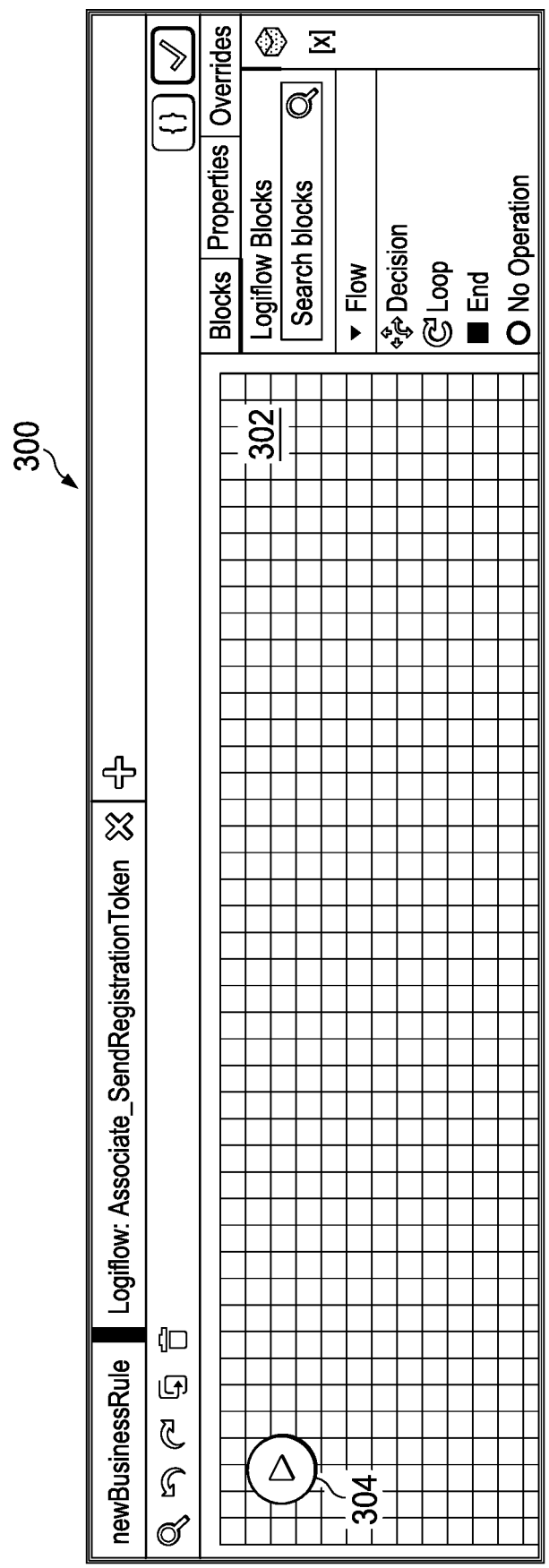
FIG. 3 depicts a newly opened document for constructing a user interface logic flow in accordance with an illustrative embodiment.

FIG. 3 depicts a newly opened document for constructing a UI logic flow in accordance with an illustrative embodiment. In the present example, when the user opens the new document 302, the document automatically begins with a start stage 302 by default.

Figure 4:
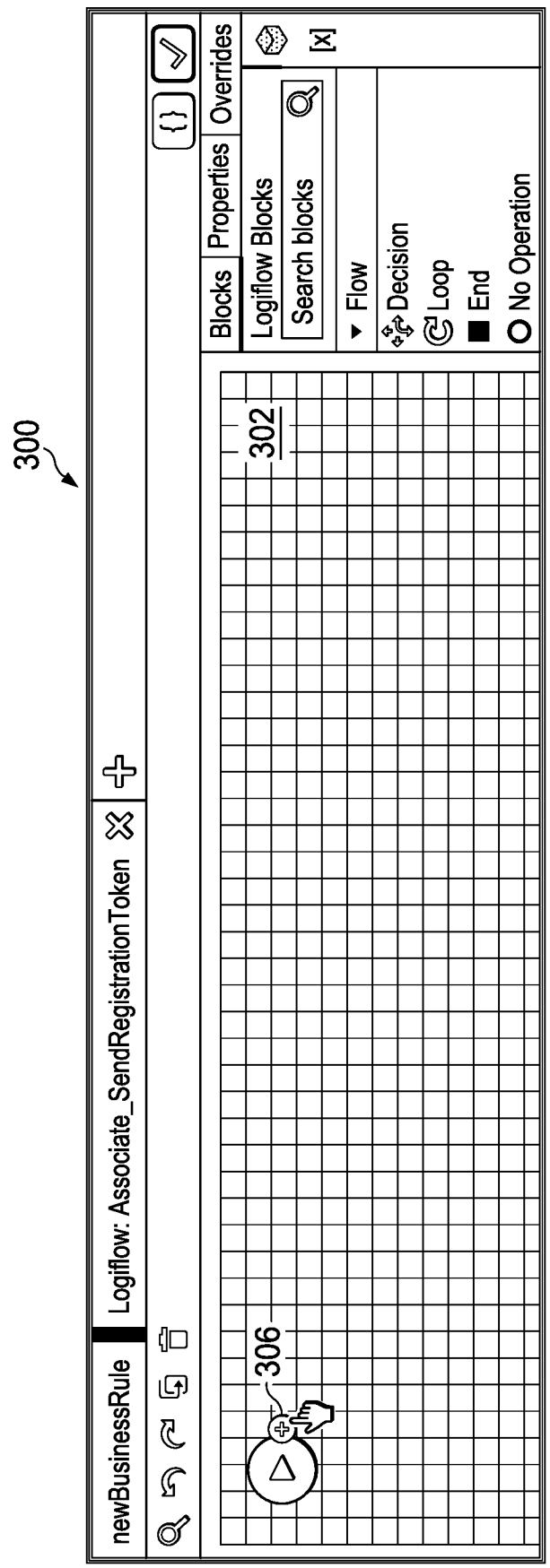
FIG. 4 depicts an addition icon for adding another stage to the logic flow document in accordance with an illustrative embodiment.

FIG. 4 depicts an addition icon for adding another stage to the logic flow document in accordance with an illustrative embodiment. When the user wants to add another stage to the logic flow in canvas 300, the user can hover the cursor over start stage 304, which causes add button 306 to appear.

Figure 5:
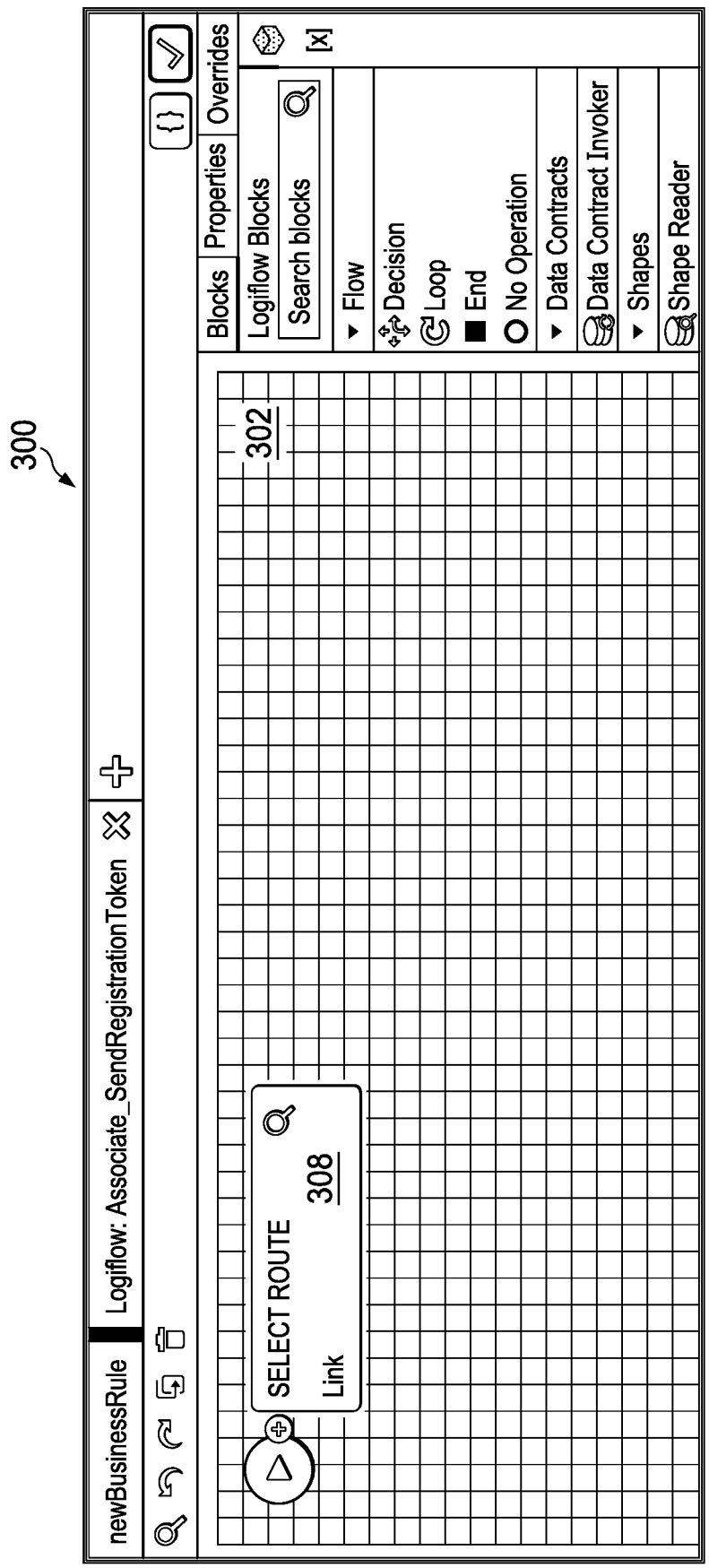
FIG. 5 depicts a route menu for the logic flow document in accordance with an illustrative embodiment.

FIG. 5 depicts a route menu for the logic flow document in accordance with an illustrative embodiment. When the user clicks on the add button 306, a route menu 308 appears, which allows the user to select a process path after start stage 304. The route choices presented in menu 308 might be determined by the type of preceding stage. In the present example, since stage 304 is a start stage the only route choice provided in menu 308 is linking to a subsequent stage. For other types of stages, the route choices might include, e.g., success, error, true, false, etc., depending on the type of stage in question (e.g., decision, ETL job, etc.).

Figure 6:
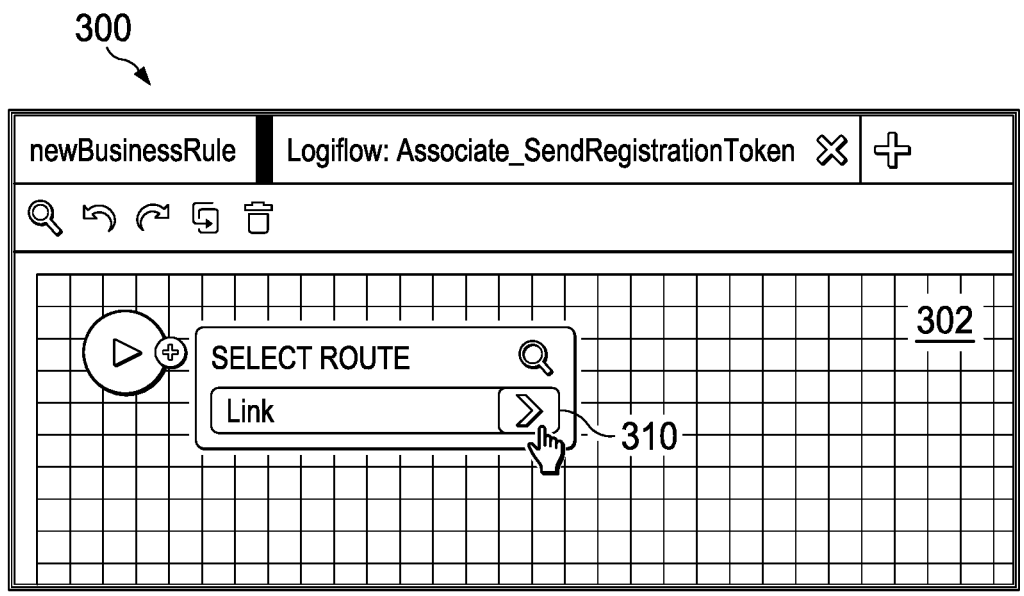
FIG. 6 depicts selection of a route to another stage for the logic flow document in accordance with an illustrative embodiment.

FIG. 6 depicts selection of a route to another stage for the logic flow document in accordance with an illustrative embodiment. The user selects the arrow 310 for the Link option, which will call up a sub-menu of possible next stages, shown in FIG. 7.

Figure 7:
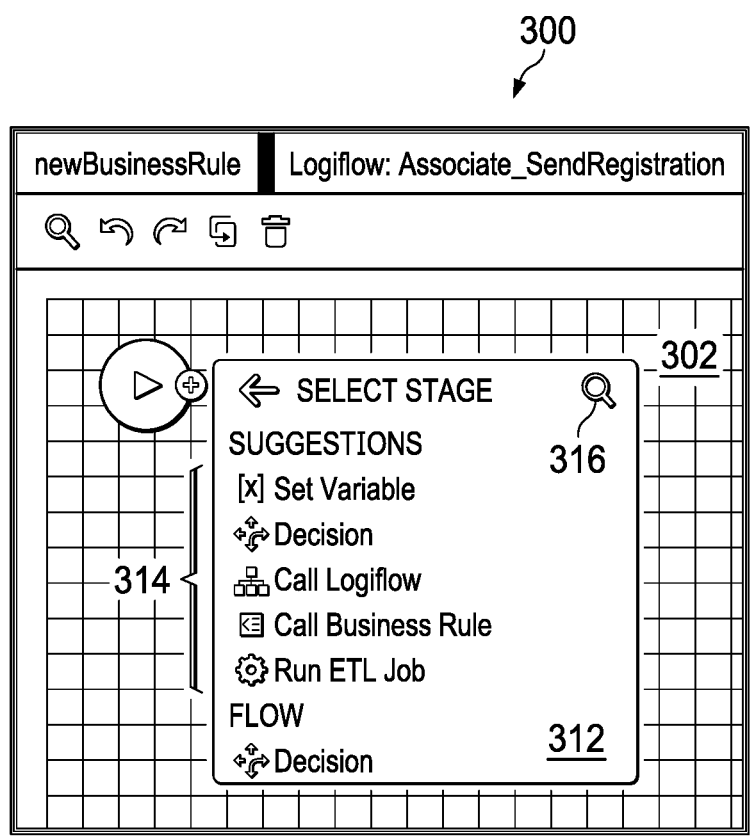
FIG. 7 depicts a next stage menu for the logic flow document in accordance with an illustrative embodiment.

FIG. 7 depicts a next stage menu for the logic flow document in accordance with an illustrative embodiment. Next stage menu 312 comprises a number of suggested next stages 314 based on the frequency with which past users have added those stages to other process flows. Suggestions 314 are generated by a machine learning engine, such as machine learning engine 206 in FIG. 2. Suggestions 314 might be generated from predictions about the next stage in the flow based on the frequency with which past developers have added particular stages or the probability that a developer would add a following stage based on what stages already exist on document 302. Stage menu 312 might also display stages that are already on the document 302, allowing the route to connect back to a previous stage.

The user may choose one of the suggested stages 314 provided by the machine learning engine but does not have to do so. The machine learning suggestions 314 are provided to assist the user, not limit the user's options. The user may also choose another stage listed in the menu 312 that is not one of the suggestions. The user can scroll through a standard list of stages in menu 312. These standard stages can also be made available to the user in a block menu (not shown) in the interface. The user might also use a search function, represented by magnifying glass icon 316 to search for available stages (i.e. stored in task library 210).

Figure 8:
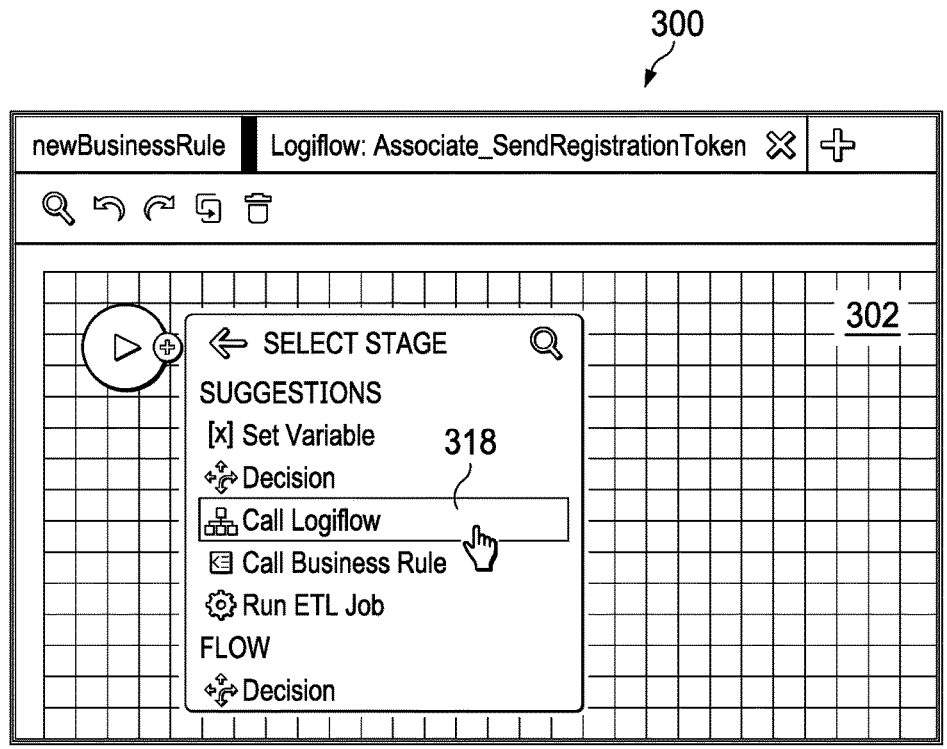
FIG. 8 depicts selection of a next stage for the logic flow document in accordance with an illustrative embodiment.

FIG. 8 depicts selection of a next stage for the logic flow document in accordance with an illustrative embodiment. In the present example, the user selects the stage Call Logiflow 318 from among the suggestions.

Figure 9:
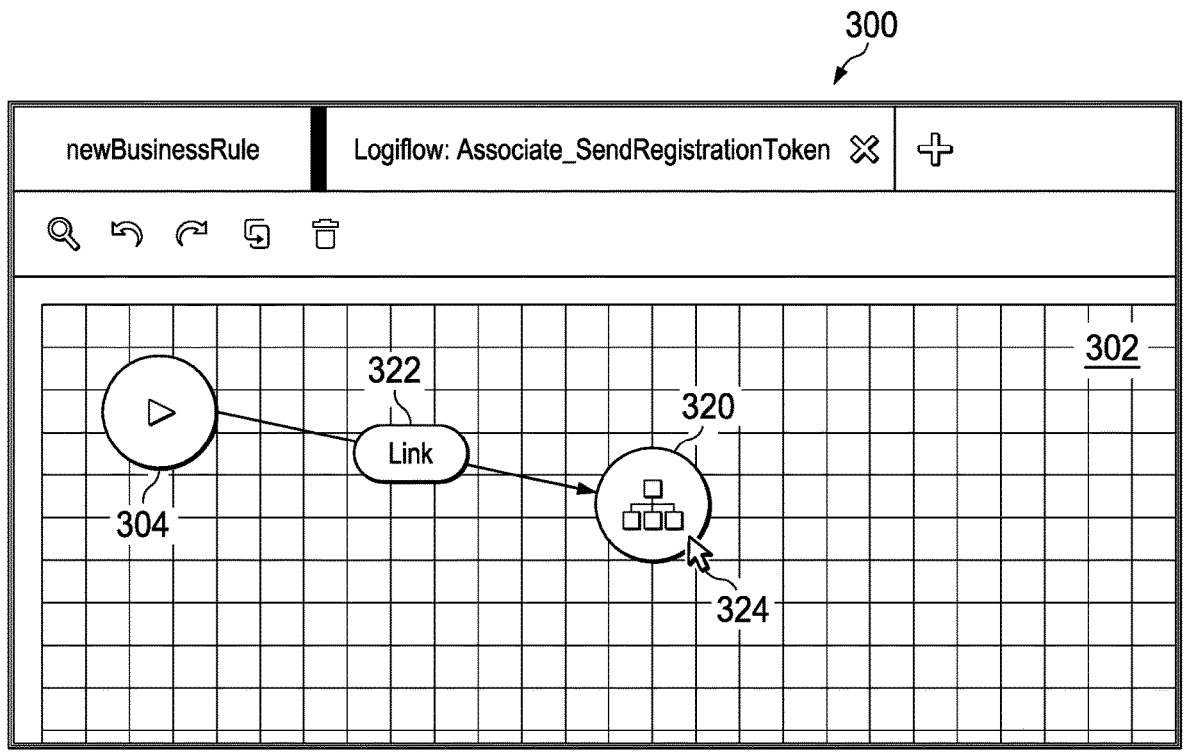
FIG. 9 depicts the addition of the next stage to the logic flow document in accordance with an illustrative embodiment.

FIG. 9 depicts the addition of the next stage to the logic flow document in accordance with an illustrative embodiment. In the present example, after selection of Call Logiflow 318 from the suggestions, a Call Logiflow stage 320 is added to document 302. The Call Logiflow stage 320 is connected to start stage 304 by link 322, which was previously selected from route menu 308. In an embodiment the icon for Call Logiflow stage 320 is "stuck" to cursor 324, allowing the user to move the icon to any position on document 302 the user sees fit while maintaining link 322 to start stage 304.

The steps illustrated in FIGS. 3-9 can be repeated for additional stages added to the logic flow of document 302, finishing with the addition of an end stage.

Figure 10:
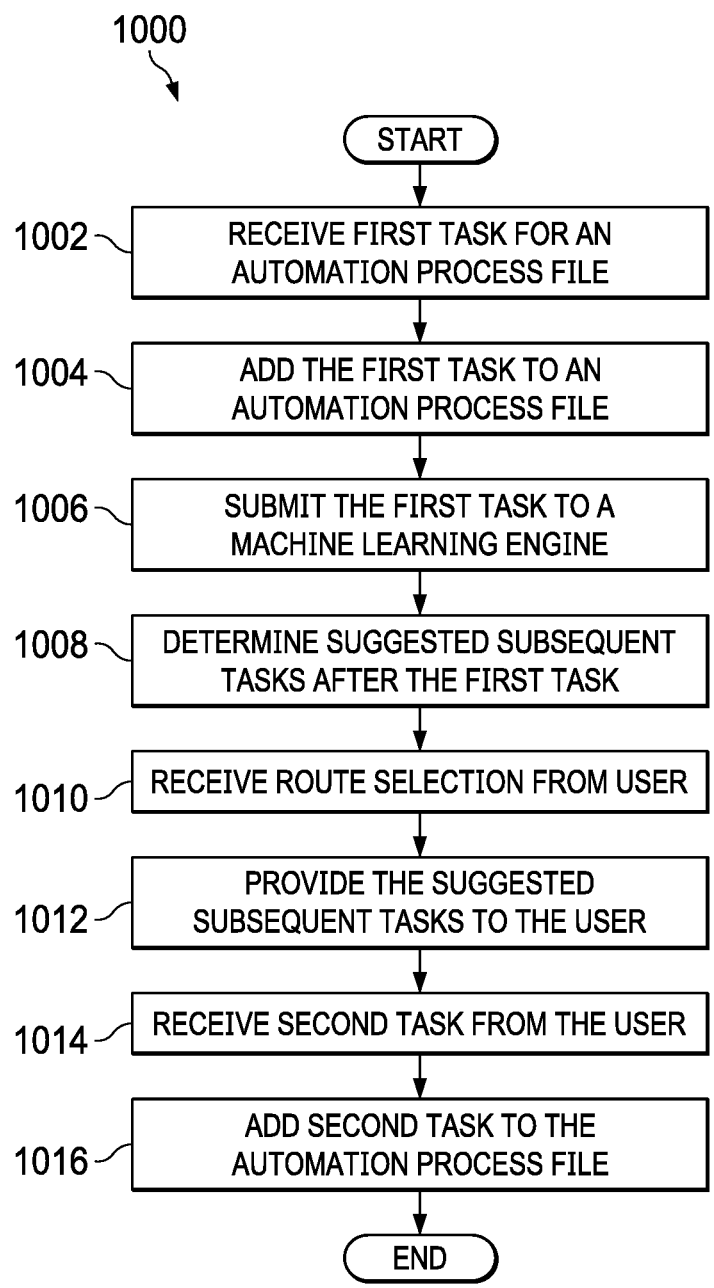
FIG. 10 depicts a flowchart illustrating a process for designing a user interface logic flow in accordance with an illustrative embodiment.

FIG. 10 depicts a flowchart illustrating a process for designing a UI logic flow in accordance with an illustrative embodiment. The process in FIG. 10 can be implemented in hardware, software, or both. When implemented in software, the process can take the form of program code that is run by one of more processor units located in one or more hardware devices in one or more computer systems. Process 1000 might be implemented in computer system 200 shown in FIG. 2.

Process 1000 beings by receiving from a user a first task for an automation process file, wherein the automation process file defines a set of system activities for an automation interface (step 1002). The first task is added to the automation process file (step 1004). The automation process file might comprise a beginning task, a number of user-defined tasks, and a stop task. The tasks might be defined as JavaScript Object Notation (JSON) objects.

The first task is then submitted to a machine learning engine (step 1006). The machine learning engine determines a number of suggested subsequent tasks to be performed after the first task (step 1008). The suggested subsequent tasks might be based on the frequencies with which previous users have used each suggested subsequent task after tasks already added to the automation process file.

A route selection is received from the user, which defines a process path from the first task (step 1010).

The suggested subsequent tasks are then provided to the user (step 1012). Providing the suggested subsequent tasks to the user might comprise displaying the suggested subsequent tasks to the user through a drop-down menu.

A second task is received from the user to be performed subsequent to the first task (step 1014). The second task may be selected from the suggested subsequent tasks but does not have to be. The second task received from the user might not be one of the suggested subsequent tasks. However, all tasks added to the automation process file are selected from a menu of predefined tasks, such as contained in task library 210 in FIG. 2.

The second task is added to the automation process file (step 1016). The second task received from the user is connected to the first task by the route receive in step 1010. Process 1000 then ends.

Figure 11:
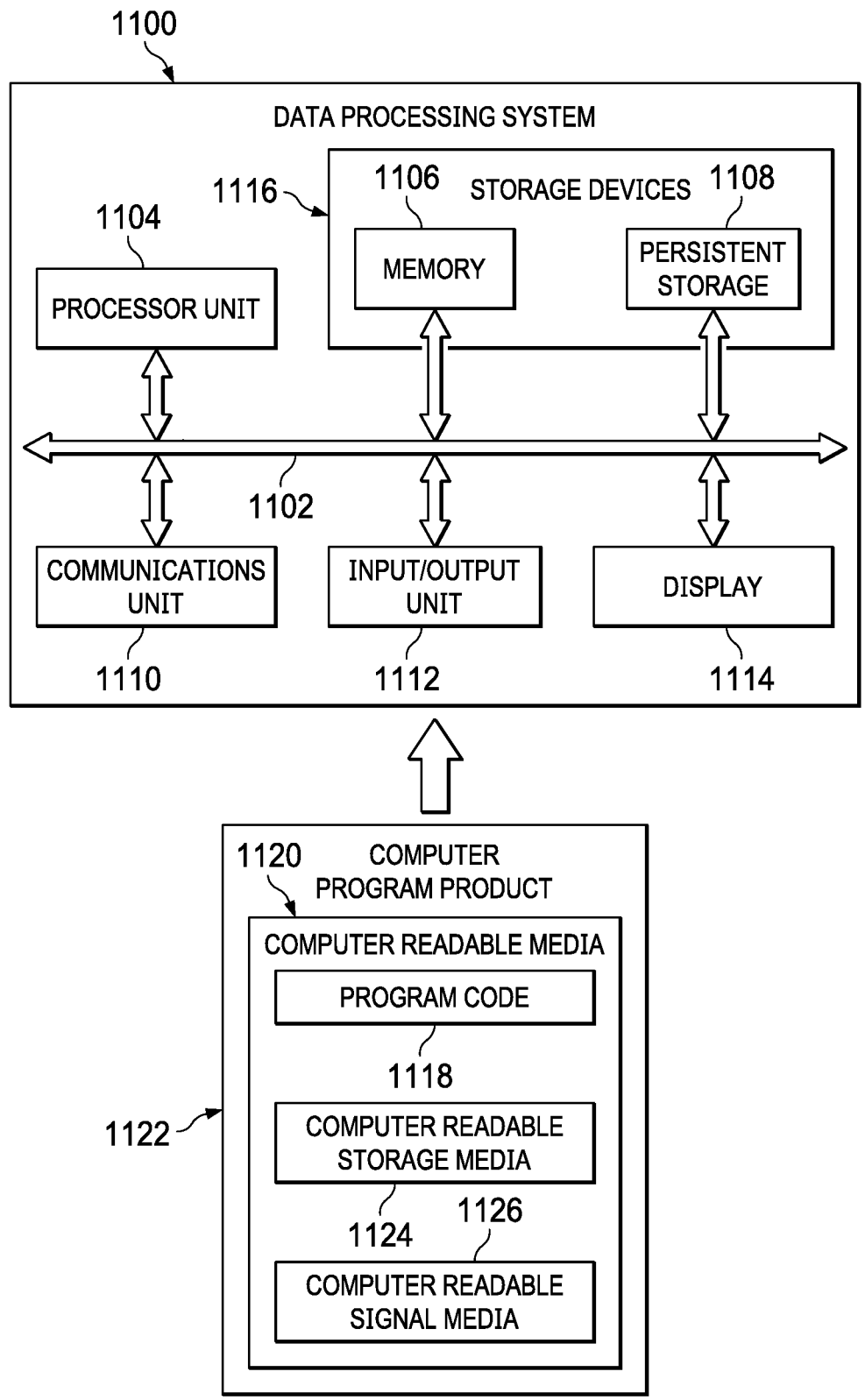
FIG. 11 is an illustration of a block diagram of a data processing system in accordance with an illustrative embodiment.

Turning now to FIG. 11, an illustration of a block diagram of a data processing system is depicted in accordance with an illustrative embodiment. Data processing system 1100 may be used to implement one or more computers shown in FIG. 1 (e.g., client devices 110 and servers 104, 106) and computer system 200 in FIG. 2. In this illustrative example, data processing system 1100 includes communications framework 1102, which provides communications between processor unit 1104, memory 1106, persistent storage 1108, communications unit 1110, input/output unit 1112, and display 1114. In this example, communications framework 1102 may take the form of a bus system.

Processor unit 1104 serves to execute instructions for software that may be loaded into memory 1106. Processor unit 1104 may be a number of processors, a multi-processor core, or some other type of processor, depending on the particular implementation. In an embodiment, processor unit 1104 comprises one or more conventional general-purpose central processing units (CPUs). In an alternate embodiment, processor unit 1104 comprises one or more graphical processing units (CPUs).

Memory 1106 and persistent storage 1108 are examples of storage devices 1116. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1116 may also be referred to as computer-readable storage devices in these illustrative examples. Memory 1116, in these examples, may be, for example, a random access memory or any other suitable volatile or non-volatile storage device. Persistent storage 1108 may take various forms, depending on the particular implementation.

For example, persistent storage 1108 may contain one or more components or devices. For example, persistent storage 1108 may be a hard drive, a flash memory, a rewritable optical disk, a rewritable magnetic tape, or some combination of the above. The media used by persistent storage 1108 also may be removable. For example, a removable hard drive may be used for persistent storage 1108. Communications unit 1110, in these illustrative examples, provides for communications with other data processing systems or devices. In these illustrative examples, communications unit 1110 is a network interface card.

Input/output unit 1112 allows for input and output of data with other devices that may be connected to data processing system 1100. For example, input/output unit 1112 may provide a connection for user input through at least one of a keyboard, a mouse, or some other suitable input device. Further, input/output unit 1112 may send output to a printer. Display 1114 provides a mechanism to display information to a user.

Instructions for at least one of the operating system, applications, or programs may be located in storage devices 1116, which are in communication with processor unit 1104 through communications framework 1102. The processes of the different embodiments may be performed by processor unit 1104 using computer-implemented instructions, which may be located in a memory, such as memory 1106.

These instructions are referred to as program code, computer-usable program code, or computer-readable program code that may be read and executed by a processor in processor unit 1104. The program code in the different embodiments may be embodied on different physical or computer-readable storage media, such as memory 1106 or persistent storage 1108.

Program code 1118 is located in a functional form on computer-readable media 1120 that is selectively removable and may be loaded onto or transferred to data processing system 1100 for execution by processor unit 1104. Program code 1118 and computer-readable media 1120 form computer program product 1122 in these illustrative examples.

In one example, computer-readable media 1120 may be computer-readable storage media 1124 or computer-readable signal media 1126.

In these illustrative examples, computer-readable storage media 1124 is a physical or tangible storage device used to store program code 1118 rather than a medium that propagates or transmits program code 1118. Computer readable storage media 1124, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Alternatively, program code 1118 may be transferred to data processing system 1100 using computer-readable signal media 1126. Computer-readable signal media 1126 may be, for example, a propagated data signal containing program code 1118. For example, computer-readable signal media 1126 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 1100 are not meant to provide architectural limitations to the manner in which different embodiments may be implemented. The different illustrative embodiments may be implemented in a data processing system including components in addition to or in place of those illustrated for data processing system 1100. Other components shown in FIG. 11 can be varied from the illustrative examples shown. The different embodiments may be implemented using any hardware device or system capable of running program code 1118.

As used herein, the phrase "a number" means one or more. The phrase "at least one of", when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item C. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A computer-implemented method of designing a logic flow for a user interface, the method comprising:
   using a number of processors to perform the steps of:
   receiving from a user a first task for an automation process file, wherein the automation process file defines a set of system activities;
   adding the first task to the automation process file;
   submitting the first task to a machine learning engine;
   determining, with the machine learning engine, a number of suggested subsequent tasks to be performed after the first task, wherein the suggested subsequent tasks are based on frequencies with which previous users have used each suggested subsequent task after the first task;
   providing the suggested subsequent tasks to the user;
   receiving a second task from the user to be performed subsequent to the first task, wherein the second task may be selected from the suggested subsequent tasks; and
   adding the second task to the automation process file.

2. The method of claim 1, wherein the automation process file comprises:
   a beginning task;
   a number of user-defined tasks; and
   a stop task.

3. The method of claim 1, wherein all tasks added to the automation process file are selected from a menu of pre-defined tasks.

4. The method of claim 1, wherein the tasks are defined as JSON objects.

5. The method of claim 1, wherein providing the suggested subsequent tasks to the user comprises displaying the suggested subsequent tasks to the user through a drop-down menu.

6. The method of claim 1, wherein the second task received from the user is not one of the suggested subsequent tasks.

7. The method of claim 1, further comprising receiving a route from the user, wherein the route defines a process path from the first task.

8. The method of claim 7, wherein the second task received from the user is connected to the first task by the route.

9. A system for designing a logic flow for a user interface, the system comprising:
   a bus system;
   a storage device connected to the bus system, wherein the storage device stores program instructions; and
   a number of processors connected to the bus system, wherein the number of processors execute the program instructions to:
   receive from a user a first task for an automation process file, wherein the automation process file defines a set of system activities;
   add the first task to the automation process file;
   submit the first task to a machine learning engine;
   determine, with the machine learning engine, a number of suggested subsequent tasks to be performed after the first task, wherein the suggested subsequent tasks are based on frequencies with which previous users have used each suggested subsequent task after the first task;
   provide the suggested subsequent tasks to the user;
   receive a second task from the user to be performed subsequent to the first task, wherein the second task may be selected from the suggested subsequent tasks; and
   add the second task to the automation process file.

10. The system of claim 9, wherein the automation process file comprises:
    a beginning task;
    a number of user-defined tasks; and
    a stop task.

11. The system of claim 9, wherein all tasks added to the automation process file are selected from a menu of pre-defined tasks.

12. The system of claim 9, wherein the tasks are defined as JSON objects.

13. The system of claim 9, wherein providing the suggested subsequent tasks to the user comprises displaying the suggested subsequent tasks to the user through a drop-down menu.

14. The system of claim 9, wherein the second task received from the user is not one of the suggested subsequent tasks.

15. The system of claim 9, where in the process further execute instructions to receive a route from the user, wherein the route defines a process path from the first task.

16. The system of claim 15, wherein the second task received from the user is connected to the first task by the route.

17. A computer program product for designing a logic flow for a user interface, the computer program product comprising:
    a computer-readable storage medium having program instructions embodied thereon to perform the steps of:
    receiving from a user a first task for an automation process file, wherein the automation process file defines a set of system activities;
    adding the first task to the automation process file;
    submitting the first task to a machine learning engine;

determining, with the machine learning engine, a number of suggested subsequent tasks to be performed after the first task, wherein the suggested subsequent tasks are based on frequencies with which previous users have used each suggested subsequent task after the first task;

providing the suggested subsequent tasks to the user;

receiving a second task from the user to be performed subsequent to the first task, wherein the second task may be selected from the suggested subsequent tasks; and adding the second task to the automation process file.

18. The computer program product of claim 17, wherein the automation process file comprises:

a beginning task;

a number of user-defined tasks; and a stop task.

19. The computer program product of claim 17, wherein all tasks added to the automation process file are selected from a menu of predefined tasks.

20. The computer program product of claim 17, wherein the tasks are defined as JSON objects.

21. The computer program product of claim 17, wherein providing the suggested subsequent tasks to the user comprises displaying the suggested subsequent tasks to the user through a drop-down menu.

22. The computer program product of claim 17, wherein the second task received from the user is not one of the suggested subsequent tasks.

23. The computer program product of claim 17, further comprising instructions for receiving a route from the user, wherein the route defines a process path from the first task.

24. The computer program product according to claim 23, wherein the second task received from the user is connected to the first task by the route.

* * * * *